ROTARY DISTRIBUTOR FOR SELECTING SYSTEM

Original Filed June 4, 1953 8 Sheets-Sheet 1

INVENTOR
DWIGHT V. SINNINGER
BY
ATTORNEY

Dec. 30, 1958 D. V. SINNINGER 2,866,869

ROTARY DISTRIBUTOR FOR SELECTING SYSTEM

Original Filed June 4, 1953 8 Sheets-Sheet 2

INVENTOR
DWIGHT V. SINNINGER
BY John A. Hall
ATTORNEY

Dec. 30, 1958 D. V. SINNINGER 2,866,869

ROTARY DISTRIBUTOR FOR SELECTING SYSTEM

Original Filed June 4, 1953 8 Sheets-Sheet 3

INVENTOR
DWIGHT V. SINNINGER
BY John A. Hall
ATTORNEY

Dec. 30, 1958 D. V. SINNINGER 2,866,869

ROTARY DISTRIBUTOR FOR SELECTING SYSTEM

Original Filed June 4, 1953 8 Sheets-Sheet 4

INVENTOR
DWIGHT V. SINNINGER
BY
ATTORNEY

Dec. 30, 1958 D. V. SINNINGER 2,866,869

ROTARY DISTRIBUTOR FOR SELECTING SYSTEM

Original Filed June 4, 1953 8 Sheets-Sheet 5

INVENTOR
DWIGHT V. SINNINGER
BY John A. Hall
ATTORNEY

ROTARY DISTRIBUTOR FOR SELECTING SYSTEM

Original Filed June 4, 1953 8 Sheets-Sheet 6

INVENTOR
DWIGHT V. SINNINGER
BY [signature]
ATTORNEY

INVENTOR
DWIGHT V. SINNINGER
BY John A. Hall
ATTORNEY

Dec. 30, 1958 D. V. SINNINGER 2,866,869

ROTARY DISTRIBUTOR FOR SELECTING SYSTEM

Original Filed June 4, 1953 8 Sheets-Sheet 8

INVENTOR
DWIGHT V. SINNINGER
BY [signature]
ATTORNEY

United States Patent Office 2,866,869

Patented Dec. 30, 1958

2,866,869

ROTARY DISTRIBUTOR FOR SELECTING SYSTEM

Dwight Virgil Sinninger, Oak Park, Ill., assignor to Pioneer Electric and Research Corporation, Forest Park, Ill., a corporation of Illinois Original application June 4, 1953, Serial No. 359,467. Divided and this application June 1, 1955, Serial No. 512,463

8 Claims. (Cl. 200—92)

This is a division of application Serial Number 359,467, filed June 4, 1953.

This invention relates to signaling systems and particularly to selecting means for remote control of electrically operated apparatus.

The object of the invention is to provide an economical, rugged, reliable, and simple remote control selecting means operating over a simple loop circuit and which may be employed for a variety of purposes in selecting and operating function actuate means singly or in combination of a plurality of remotely located stations.

The invention, in essence, resides in the use of start stop distributors, common in the printing telegraph art, activated by synchronous motors similar to those employed in the ubiquitous clock which depends on the present day precise regulation of the frequency of the commercial electric power supply in substantially all communities. Through the use of such motors, a selecting system need not be confined to any one location where the same power supply is available to drive all the start stop distributor motors, but may embrace an extensive area including a number of different power sources and be operated over a line long enough to be classed as a toll or long distance line. The selecting system may be used for telecommunication purposes, as for selectively enabling any one or another, or combination of, stations each provided with telecommunication apparatus so that these selected stations may be enabled. The selecting system may be used for releasing any previously enabled station or combination of stations and for setting up a new combination. In such a use a master station and a plurality of outlying stations may be joined in a conventional ring circuit over which the selection may be made and the telegraph messages may thereafter be transmitted.

It will be understood, however, that the present invention is not exclusively used for telecommunication purposes but may be employed for a wide variety of purposes where a selection and operation of one or more of a plurality of stations for any purpose is desired. The invention may be used for such simple purposes as the selective operation of call signals such as lamps, buzzers, or bells, or for the more complicated purposes of remote control of machinery.

A feature of the invention is the use of small synchronous motors for driving the start stop distributors, operated from local commercial alternating current mains, the said commercial supplies at different locations having one common characteristic, namely, a precisely regulated frequency, substantially of the same value at all locations. It will be found in practice that often the alternating current supply used for the various stations is one and the same, in other cases that a common source of precisely regulated frequency is employed by different electricity supply companies for a reference standard, and in still other cases that commercial demands lead to great accuracy in the maintenance of the frequency characteristics of the supply so that the commercial supply at all points where stations for a system of the present invention may be installed are completely adequate to cause the various distributors of the system to operate synchronously. In accordance with this feature, it is to be particulary pointed out that, highly accurate regulation of the frequency while desirable, is not necessary, for the tolerances in the operation of the distributors are wide and since any single operation is of only a few seconds duration, synchronism in the operation of a plurality of these motors is sufficiently accurate even if the regulation of the frequency of the sources is entirely inadequate for the purpose of driving the household clocks. Substantially uniform frequency for operating the motors of the system is sufficient.

The invention, known as a push button selecting system, employs a plurality of receiving stations and one or more transmitting stations each equipped with an identical switching unit, powered by a constantly operating synchronous motor, and consisting of a clutch and a distributor activated by the said motor under control of the said clutch. Upon each operation of the clutch the distributor will operate through one complete cycle consisting of a time delay of a given magnitude followed by one complete rotation of the distributor arm. By way of example, the motors may be designed to operate at 25 R. P. M. and the time delay may be 200 milliseconds, so that the complete selecting cycle is of 2.6 seconds' duration. Again, by way of example, the distributor may be provided with 15 equally spaced contact segments separated by 15 insulating spaces so that during its rotation the distributor arm makes contact with each segment over a period of practically 80 milliseconds. Of the 15 contact segments, 12 are used for selecting purposes, 11 individual to 11 possible stations and 1 for general call purposes and the remaining 3 for control purposes.

It will be understood that the above described arrangement may be varied to suit various practical purposes.

In the operation of the device, upon the activation of the clutch, a lost motion device is enabled and this consumes a period of 200 milliseconds, whereupon the distributor arm is engaged and rotates through a complete cycle of 2.4 seconds. Within this cycle of operations and in the appropriate time intervals, one or more transiently established circuits are closed corresponding to one or more push buttons operated at the transmitting station. There will be function storage means at the various stations which will respond to such closed transiently established circuits. At the end of the said selecting cycle the operated function storage means will cause the operation of corresponding function actuating means, comprised essentially of switching means for performing any desired switching operation such, for instance, as the connection of a source of power to a printing telegraph unit in the ring circuit.

In the present arrangement the fundamental circuit consists of a loop or a ring including a line relay at each receiving station and line interrupting means at each transmitting station.

Each transmitting station is provided with an apparatus unit including a row of push buttons each of which may be pushed and locked into operated position or lifted and released from such an operated position. The various push buttons are independent and one or more buttons may be operated regardless of the operated or released condition of the others. When any one or more buttons have been pushed and the selection pattern has thus been established, a start button is pushed to start the selecting cycle whereupon the remote function storage means are activated in accordance with this prearranged pattern.

There are a number of signal lamps at each station, one to indicate that the line is active and in working order and another to indicate that the local source of power is properly connected and is active. In addition, each receiving station has a signal lamp to indicate that one or more function actuate means thereat has been and is in operation. At the transmitting station there is a start or prompting lamp which indicates that some change in the pattern of operated push buttons has been made and that the circuits are in condition for operation by the use of the start button. If the start button is operated when this start or prompting lamp is dark, no operations will take place. Also at the transmitting station there is another signal lamp termed a selection assurance signal, which will indicate that some change has been made in the pattern of remotely operated function actuate means. This lamp lights at the end of a selecting cycle and will remain active until another selecting cycle is executed.

A feature of the invention is the use of an arrangement of push buttons each of which may be pushed and locked into position so as to establish a circuit for selectively activating a corresponding remote function actuate means. In addition, each button transiently establishes a (start) circuit during its operating movement either on operation or on release, whereby the conditions for starting a selecting cycle are properly established.

The normal method of operation is to push and latch into operation those buttons necessary for the selection of the desired station and when this pattern is complete to then push the start button. The start button also latches into its operated position but it is unnecessary to leave it there as its function is immediately completed upon its first movement and it is thereafter ineffective to cause any circuit change until another station selecting button is pushed. Therefore, in this normal operation, the start button may be pushed and then immediately released.

However, if the operator wishes to make but a single change at a time, as to bring in another station or to take out one of the stations in the established pattern, he may leave the start button latched in its operated position whereupon the single operation of a station selecting button will both set up the new pattern and act to start the selecting cycle. The various buttons operate and latch individually.

Another feature of the invention is a special button (marked Add Only) which may be operated in addition to a regular station button and which will prevent the transmission of the usual clear out signal. By the use of this button the attendant at one transmitting station will be enabled to add another station to the setup without disturbing the pattern of actuated means which may have been established by some other master or transmitting station.

By the use of this special button an attendant at a transmitting station may determine which receiving stations have been enabled by any other transmitting stations, for he can add each station, one at a time, and observe the selection assurance lamp at the end of each selecting cycle. If the selection assurance lamp remains dark, then such indication means that such station had already been included in the setup of enabled stations. If, on the other hand, the selection assurance lamp lights at the end of a selecting cycle, then the operator is assured that such station had not been previously enabled and he must restore this condition by releasing the station which he has just enabled. By using the (Add Only) special button on each such operation the established pattern of enabled stations will not be disturbed.

Another feature of the invention is the use of a special or reset button. The circuit at each transmitting station includes a so-called starting or prompting signal which responds only to the operation of one of the push buttons, either during its operation or during its release. During such operating or releasing movement the prompting circuit is transiently closed, thus enabling the start button. If, however, the transmitting station attendant finds he has made a mistake, he may release the condition he has established by the use of his reset button which will release the prompting circuit and render the start button inactive.

Another feature of the invention is the use of a single push button for combining the functions of two buttons, above described, and particularly two seemingly contradictory functions. The use of a reset button for releasing the prompt relay, extinguishing the prompt signal and disconnecting power from the start button, has been explained hereinbefore. Also the use of the Add Only button for preventing the transmission of the clear out pulse whereby one or more distant receiving stations might be inadvertently dropped out of the pattern of enabled stations has been explained. In accordance with the present feature, the connections for these two functions have been put on a single button. The Add Only connections consist of a pair of normally made contacts which are used to open a circuit when the button is operated and latched. The reset connections consist of a pair of normally made contacts which are used to open a circuit during the movement of the button either in operation or in release, or by a partial operation and release thereof, the circuit therethrough being closed both when the button is fully operated or fully released.

By means of this feature a unique result is obtained. A simple operation and release of the button will perform the reset function, but a complete operation and latching of the button will establish the Add Only circuit condition and in its movement will perform the reset operation, that is, it will cause the prompt signal to be extinguished and will remove power from the start button so that the operator will be signalled that some other button, that corresponding to the station he wishes to add, must be pushed. Thus, after the double function, button has been operated and latched for the Add Only function, the power source may again be connected to the start button and the prompt signal may again be displayed by the operation of the button corresponding to the station to be added.

Another feature of the invention is the complete disablement of the starting button until a change in the setup of enabled stations, either the addition of another or the release of one previously enabled, has been provided for by the operation or release of one of the buttons. This is secured by the use of the prompting circuit, a type of trigger circuit which can only be cocked by the movement of one of the station or function buttons. This trigger circuit may be uncocked by the operation of the reset button.

Another feature of the invention is the use of push buttons which will be mechanically latched in operated position and which may be mechanically unlatched by a simple lifting operation. For safety and to prevent the inadvertent unlatching of these buttons, the latching slot is cut at an angle so that the lifting must be accompanied by a slight operating push to accomplish the release of an operated button.

A feature of the invention is a gate circuit whereby each receiving station is enabled and made responsive to selecting codes of the transmission, at the beginning of a selecting cycle, of a particular and precisely timed code of marking and spacing signals. Each selecting code therefore consists of an enabling code followed thereafter by a selecting code. The use of this enabling code is a key without the use of which the circuit of the receiving station cannot be entered and without which, therefore, the established connections thereat cannot be disturbed.

Another feature of the invention is a gate circuit responsive to a train of pulses in the nature of random or coded signals transmitted over the line for purposes other than that of selecting and operating the function actuate relays at the various receiving stations which will lock out the receiving apparatus to prevent erratic response of any component thereof to such other signals. It is conventional to provide means in the nature of slow acting relays to prevent the response of the selecting apparatus to signals transmitted over the line for such other purposes, but in such prior art systems the slow operating relays are subjected to wear and their chattering creates a disturbance. Where the line is used constantly for the transmission of intelligence, let us say, in the form of printing telegraph signals, and only occasionally for a station selecting operation, it is desirable to blind the receiving apparatus to these predominant traffic signals. The gate circuit of the present feature provides such a blinding means.

In accordance with this feature, the predominant traffic signals are employed to create a potential sufficient to operate and to maintain a gate relay in operation. When a selecting signal is to be sent then a prolonged spacing signal is transmitted, as part of the selecting signal, which deactivates the said gate relay, and this is followed by a prearranged code which will operate a receiving gate before the said potential can again be set up and this receiving gate will disable the first said gate to prevent the building up of the said potential during the transmission of the selecting code.

A feature of the invention is a selective device for any receiver of pulses. The above described clutch gate is of broad application and is not confined to use in the selecting system of the present invention but its use may be comprehended by disclosure of the manner of its operation in the present system.

Exposure of the receivers of the present system to incessant signal traffic ordinarily would repeatedly operate the clutches thereof within their lost motion arcs of travel, causing annoyance and imposing wear due to impact. More important, a design to tolerate this chatter is badly compromised since the clutch armature mass must be kept low and/or the restoring spring tension must be kept high to assure complete homing in between marking pulses of traffic, lest the armature accumulate a lead and edge up to the end of the start slot to initiate a spurious cycle. This compromising is most severe in the conventional 100 speed printing telegraph signaling. The requirement for high spring tension calls for firmer normal position holding means which, in turn, depletes the synchronous torque capability of the driving motor. The clutch gate circuit of the present feature is a means for overcoming the stringent requirement imposed by this vicious cycle.

The receiver clutch must always be capable of acting on a start signal, herein, a spacing pulse. While electrical means for differentiating between pulses of different durations might be devised and employed to arrange the clutch circuit to ignore a short space pulse but to act upon a long one, the commercial tolerance of electrical circuit components renders reliability of such a delay means inferior to the accuracy of the rotation of such mechanical components as the synchronous motor. Even though originally set up with carefully selected resistance and capacity components to perform satisfactorily, aging more than often moves values out of tolerance, with the result that selecting mechanisms are liable to start at different times and remain out of step. The receiver clutch must be capable of operating on any spacing signal that follows an idle condition.

Accordingly, an asymmetrical device is employed which operates immediately on any first marking pulse and stays in operation during the repetition of such marking pulses provided they follow one another with in-between spacing signals of less than approximately 210 milliseconds. The clutch gate action, responsive to this asymmetrical device will subside by itself if not fed marking pulses continuously. For example, a single space to marking condition which persists indefinitely will activate the clutch gate, but the action will subside automatically some 210 milliseconds later. A spacing signal will not activate it under any condition following a prolonged marking signal.

It will thus be seen that the asymmetrical device of the present feature provides a means whereby the relaxation of the clutch gate and the reexposure of the clutch to a spacing signal is automatic and requires no assistance from such an intentional spacing signal such as that herein employed for starting. Thus the system is receptive on the instant the start pulse is transmitted and not at some interval later measured by an electrical timing circuit. The only requirement is that the spacing start signal be not transmitted for at least a third of a second after cessation of traffic to provide time for the relaxation of the clutch gate.

The asymmetrical device of the present feature consists of a rectifier device for converting alternating current into a direct current in the clutch gate relay circuit. The rectifier device is fed from the secondary of a transformer and the primary winding thereof is placed in an oscillatory circuit including a condenser which may be charged in a low "Q" circuit and discharged in a high "Q" circuit. In accordance with this feature the condenser in the said transformer primary circuit is charged when the line relay is on its spacing contact and is then discharged when the line relay moves to its marking contact. The components of this discharge circuit are such that the discharge is oscillatory in character and therefore an alternating current is produced in the secondary of the said transformer whereby a direct current is produced by the said rectifier device sufficient to operate the clutch gate relay.

The precisely timed code to which the gate circuit responds so as to enable the receiving station, consists of (1) a mark pulse of indefinite length but of at least enough length to allow the condenser discharge to die down to a point where the derived direct current is insufficient to maintain the clutch gate in operation, (2) a prolonged spacing pulse of exactly the time necessary to take up the lost motion in the clutch, move the distributor off normal and bring the distributor brush to the pregate segment, (3) a mark signal transmitted when the distributor has moved to such a point that any operation of the clutch gate relay would be ineffective to interfere with the receiving station, precisely timed to be sent from the transmitting station and received at all the receiving stations where transiently established circuits for the reception of this pulse have been simultaneously established, and (4) a spacing pulse sent by the transmitting station and received by each of the receiving stations as the distributors thereat are passing over the gate segments. By way of example and as charted herein (1) the mark pulse must be at least one third of a second, (2) the space pulse must be 320 milliseconds—allowing 200 milliseconds for the engagement of the clutch, 40 milliseconds for the distributor brush to move off the stop segment and 80 milliseconds for the distributor brush to move into engagement with the pregate segment, (3) the mark pulse must be within a period of 80 milliseconds while the brushes at all stations are traversing the pregate segments, and (4) the space pulse must be within a period of the next 80 milliseconds and while the distributor brushes at all receiving stations are traversing the gate segments during the middle third (27 milliseconds) of this period.

Any deviation from this precise pattern, such as a mark pulse within a third of a second just preceding the first prolonged space pulse, such as a mark pulse within the first 200 milliseconds of this first prolonged space pulse or the failure to receive the mark pulse until after the distributor brush has entirely passed over the pregate segment will either stop the action of the distributors or render the receiving stations incapable of response to any following mark signals.

The clutch gate responds to any single mark pulse and will remain in operation on a train of mark pulses following each other with intervening space pulses shorter than one third of a second.

A feature of the invention may therefore be stated as the combination of a pair of mutually dependent gate circuits, one responsive to predominant traffic signals for blinding the receiving circuits to such signals and the other responsive to a particular and precisely timed code for enabling the receiving circuits and for disabling the blinding gate.

A feature of the invention may be stated as a pair of gate circuits, each functioning to disable the other, one of which operates in response to a definite and prearranged code while the other responds to any code or train of pulses. The operation is in the nature of a race and a characteristic of the prearranged code for operating the first gate is a prolonged code element designed to promote the relaxation of the second gate whereby the first gate may respond and disable the second gate before the second gate may effectively respond to this prearranged code.

Another feature of the invention is a gate circuit made responsive to the synchronous operation of a pair of distributors, one at the transmitting station and one at the receiving station, or one at each of several receiving stations. The circuits at the transmitting station, through the distributor thereat, produce a plurality of precisely timed signals which must find circuits through the distributor at each of the receiving stations. Thus the distributors are instrumental in determining whether or not the selecting cycle which they have started is to be effective. A feature of the invention may therefore be stated to be gating derived from the commutators or distributors and thus serves not only to differentiate between selecting cycle signals and other signals, but to assure the synchronism of the transmitting and the receiving devices.

Another feature of the invention is what may be termed a dual key system unlocking gate, which employs a pair of gate relays which must be operated in sequence each within a particular time interval. A sequence of pulses each of a different character is produced by the transmitting distributor and a corresponding sequence of opportunities for the the operation of said relays is produced by the receiving circuit distributor, the opportunity for the second being under the direct control of the first relay and becoming effective only if the first relay becomes operated within its opportunity.

Another feature of the invention is a combined gate and clear out function. A characteristic feature of this system is that the first effective operation within a selecting cycle (except when this is especially avoided) is the release of all function storage devices. Since this is first it may be combined with and made a part of the gating operation, thus saving commutator space which may be employed for an additional selection.

Another feature of the invention is a selecting system having a plurality of receiving stations each having one or more function actuate means. Each function actuate means consists of a switch for introducing a given circuit into the line or for otherwise enabling a given circuit for any desired purpose. This feature resides in the provision of a function actuate means which may be selectively operated or selectively released and which is unresponsive to selecting operations directed to other such means. Heretofore the first operation in a selecting operation was to release all function actuate means and then to reoperate all of those still wanted as well as others desired and for which the new selecting operation is carried out. Therefore, on each selecting operation there was a disturbance of previously operated means. In accordance with the present feature, previously operated function actuate means is left undisturbed.

Another feature of the invention is the provision of means for making a change in the pattern of enabled switching devices or function actuate means only at the end of the selecting cycle. The function storage means are provided as heretofore and all these are released as the first act in the selecting cycle but do not become effective until the end of the cycle. Thus, where a particular function actuate means has been operated and it is to be left operated, its function storage means is released at the beginning of the cycle and then reoperated at its given place in the cycle so that the switch is left undisturbed and the device operated by this switch or function actuate means is not disturbed.

In accordance with the present invention any one or more function actuate means may be operated or may be released on each selecting operation. The transmitting stations each have a plurality of push buttons, each of which may be individually latched in its operated position, or which may be individually unlatched and released to its unoperated position. If a pattern of function actuate means has previously been established through the operation and latching of a given button or a plurality of buttons, this pattern may be changed by the operation and latching of one or more of said buttons or the unlatching and release of one or more of the said previously latched buttons. The selecting cycle is then started and the new pattern will be established and without disturbance to those previously operated function actuate means which have not been changed.

Another feature of the invention is a selection assurance circuit which functions at the end of a selecting cycle to indicate that a change has been made, either one or more new function actuate means has been operated or one or more previously operated means has been released.

By this means the attendant at a transmitting station may ascertain whether any given function actuate means has or has not been previously operated. If, by way of example, he wishes to have, let us say, station number 6 cut in on the circuit and does not know if this has been done by some other transmitting station, then he may operate his station number 6 button and start the selecting cycle. If the selection assurance lamp or indicator operates at the end of the cycle, then he will know that a change has been made and that station num-6 had not been cut in previously and that now it has been cut in. If, on the other hand, the selection assurance lamp or indicator fails to show at the end of the cycle, then he will know that this station had been previously cut in and that the selecting cycle had produced no change.

By this means an attendant at any transmitting station may check the entire setup, by thus testing each station either to see that it is included or is not included in the operated stations.

A feature of the invention is what may be termed an opportunity interval circuit by which a transient condition may be established at a transmitting station so that if a selection assurance signal is received during a particular interval the selection assurance signal will be operated, but which will otherwise insure against the operation of such signal by any like pulse at a random time.

In accordance with this feature, a relay at the transmitting station is provided to operate the selection assurance signal thereat. This relay is placed in series with a condenser and means is provided to close a charging circuit for this condenser at the end of a selecting cycle. But this charging circuit is so proportioned that the charging current is insufficient to cause the operation of the said relay. However, an alternative charging circuit is closed by the line relay upon receipt of a selection assurance pulse from any one of the receiving stations and in this alternative circuit the charging current will be sufficient to operate the said relay, providing the said selection assurance pulse is received before the said condenser can have become substantially charged in the first said charging circuit.

In a preferred embodiment of this invention disclosed herein the opportunity interval circuit is closed at one end by the off normal contacts of the distributor as the distributor reaches its normal position at the end of the cycle. Thereupon the condenser in series with the selection assurance signal relay begins to charge slowly. If (almost immediately) a selection assurance signal is received, a resistor, also in series with the said condenser, is short circuited and the charging of the condenser is increased at a much higher rate so that the charging current is now high enough to operate the said relay. Unless the selection assurance signal arrives within this opportunity interval before the said condenser can have become substantially charged, it will be ineffective. Thus a space pulse transmitted over the line at a random time will be ineffective as a selection assurance signal.

Another feature of the invention is a circuit arrangement whereby a plurality of transmitting stations as well as a plurality of receiving stations may be included in a single circuit. Each station has a synchronously operated distributor and when a selecting operation is carried out, the distributor at each receiving station and at the transmitting station being operated will be driven through a selecting cycle but the distributors at the other transmitting stations will remain inactive.

Another feature of the invention is a clutch device which is activated at the beginning of a cycle but which does not engage the distributor brush and start it into movement for a specified time. Heretofore this operation, employed to override other conventional signals which might be transmitted over the line, was controlled by a slow operating relay. In accordance with the present feature, this time delay and the clutch are combined in one device. An electromagnetic clutch is provided which, when energized, will move over a specified period toward mechanical engagement with the commutator brush. When this mechanical engagement is made, a set of off normal springs, functioning also as a latch means, is operated. Before the off normal springs are operated, the clutch may be released and the clutch will return under spring tension to its first position, but once the off normal springs are operated the commutator must complete its full cycle of operation. When the said mechanical engagement is made, the clutch is mechanically locked to the commutator brush and this mechanical lock is maintained until the off normal springs start to drop into their detent in the disc on which the commutator brush is mounted. As the mechanical lock is opened and as the off normal springs reach their home position, the clutch will be deenergized and the clutch itself will return under spring tension to its normal position. Circuit means are provided to prevent the reoperation of the clutch until another selecting operation is carried out.

The proper operation above described requires a fast release of the clutch. Accordingly, another feature of the invention is a clutch retentivity neutralization circuit. It is well known that retentivity in the magnetic circuit of a magnet tends to slow the collapse of the field when the electrical circuit of the magnet is broken. Applicant provides a pad in the circuit of the clutch magnet which will provide a small counter field so that the field of the magnet will collapse very rapidly. This pad is of such value that the normal current through the magnet winding will not be affected when the clutch circuit is closed but will, when this clutch circuit is opened, build up a small current therethrough in the opposite direction.

Another feature of the invention is the elimination of the conventional mechanical latch used in the start stop distributor art, thus eliminating the usual solenoid employed for unlatching the distributor arm at the beginning of the cycle. In place of this mechanical latch, the circuit arrangement consisting essentially of a start relay and the off normal springs are employed together with the above said clutch retentivity neutralization means for insuring a quick disengagement of the clutch when the off normal springs drop into their detent at the end of the cycle.

Still another feature of the invention is a blinding circuit for preventing selecting cycle signals from entering other apparatus connected to the fundamental circuit. By way of example, the fundamental circuit may be used as a printing telegraph channel as well as a selecting circuit. Each station has a start relay and contacts of this relay are employed to blind such a printing telegraph instrument by connecting its line relay armature to its marking contact during a selecting cycle. Another type blinding is provided which is effective when a particular printing telegraph instrument has not been called into operation. Both types of blinding become inoperative when a particular instrument has been enabled and the line is not being used for the transmission of selecting pulses.

Another feature of the invention is a so-called "send" key which may be used at a remote station for locally enabling a device such as a printing telegraph station. When the line is not in use the operator at such a remote station by operating his local "send" key may power his telegraph instrument and transmitting printing telegraph signals over the line.

Other features will appear hereinafter.

The drawings consist of eight sheets having eleven figures, as follows.

Figure 8:
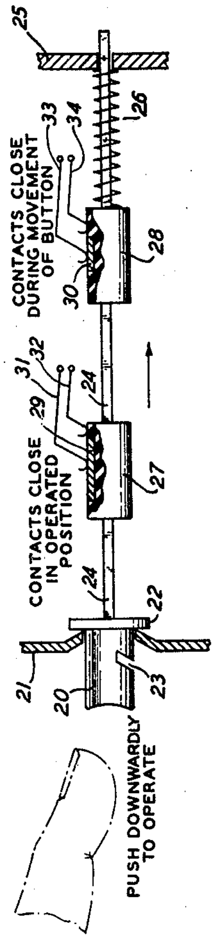
Figure 9:
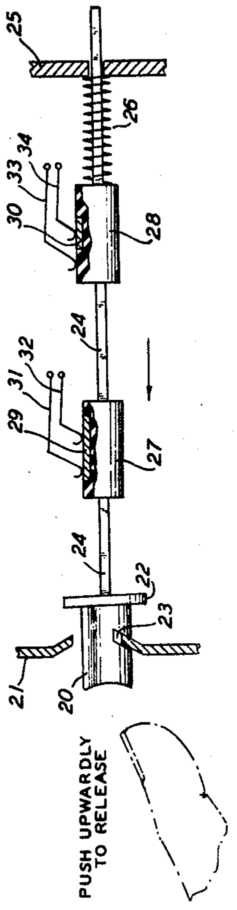
Figures 3, 11:
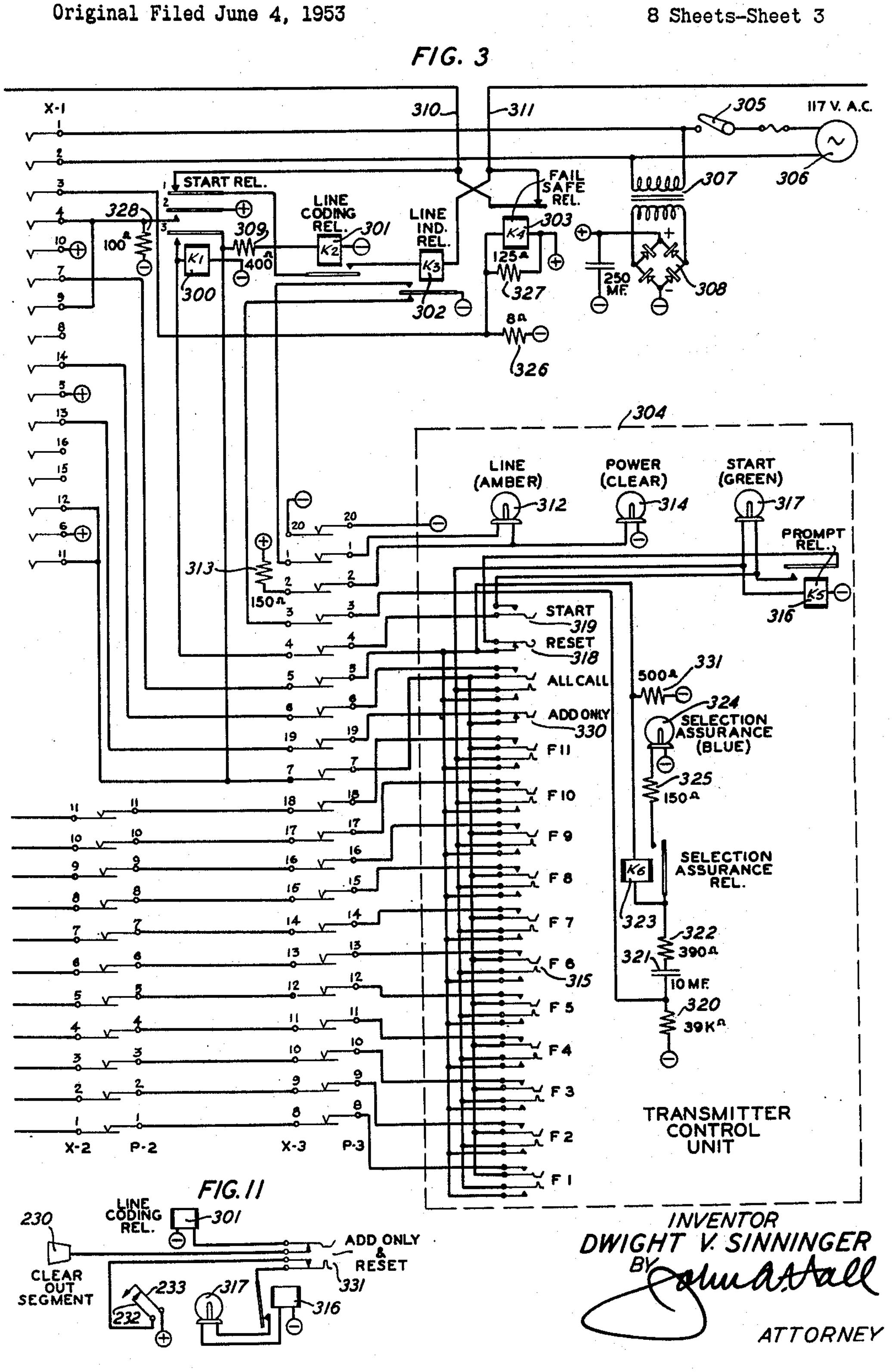
Fig. 3 is a schematic circuit diagram which when placed to the right of Fig. 2 represents a transmitting station.
Figure 4:
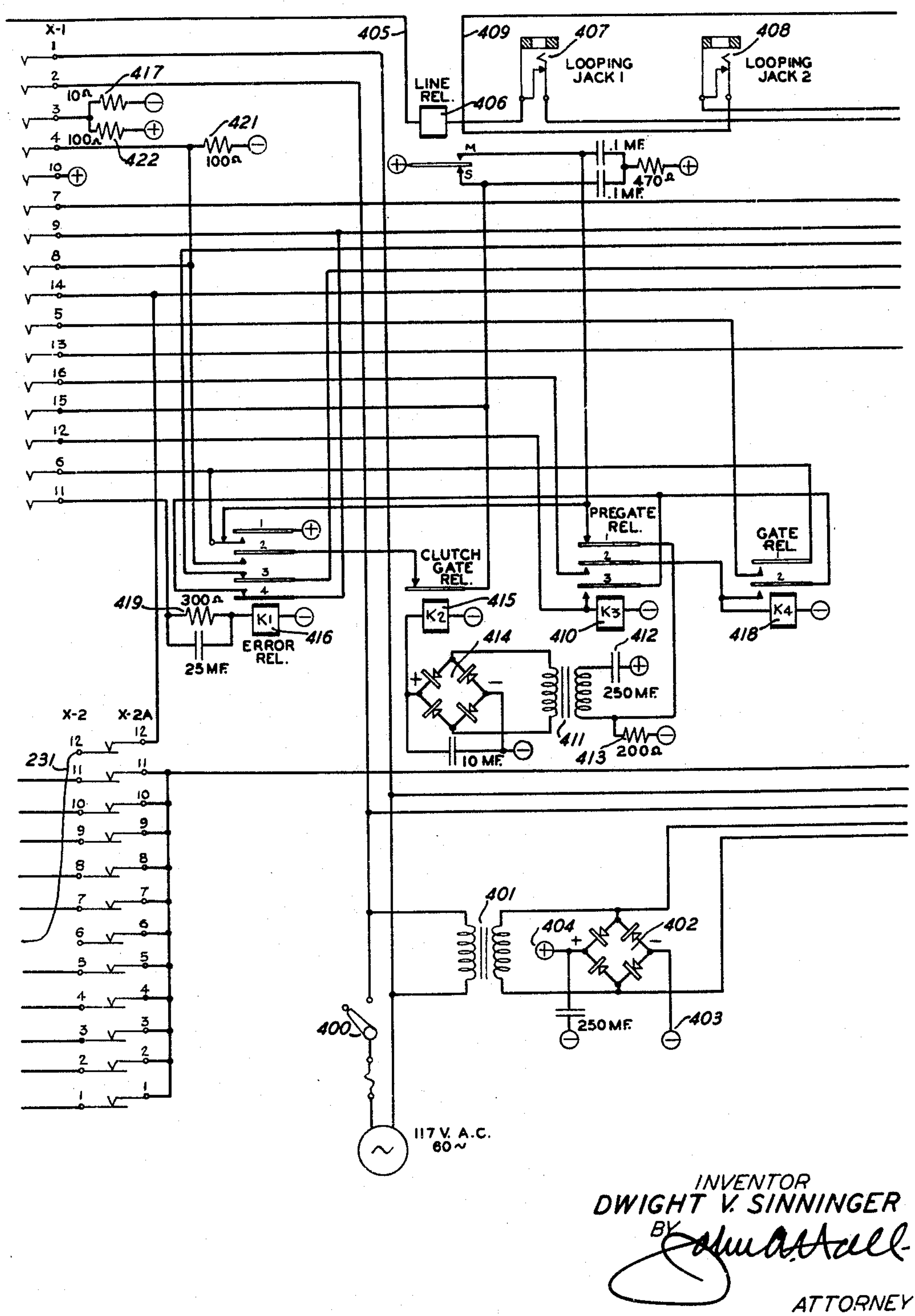
Fig. 4 and Fig. 5 are schematic circuit diagrams which, when placed to the right of Fig. 2, represent a receiving station.
Figure 6:
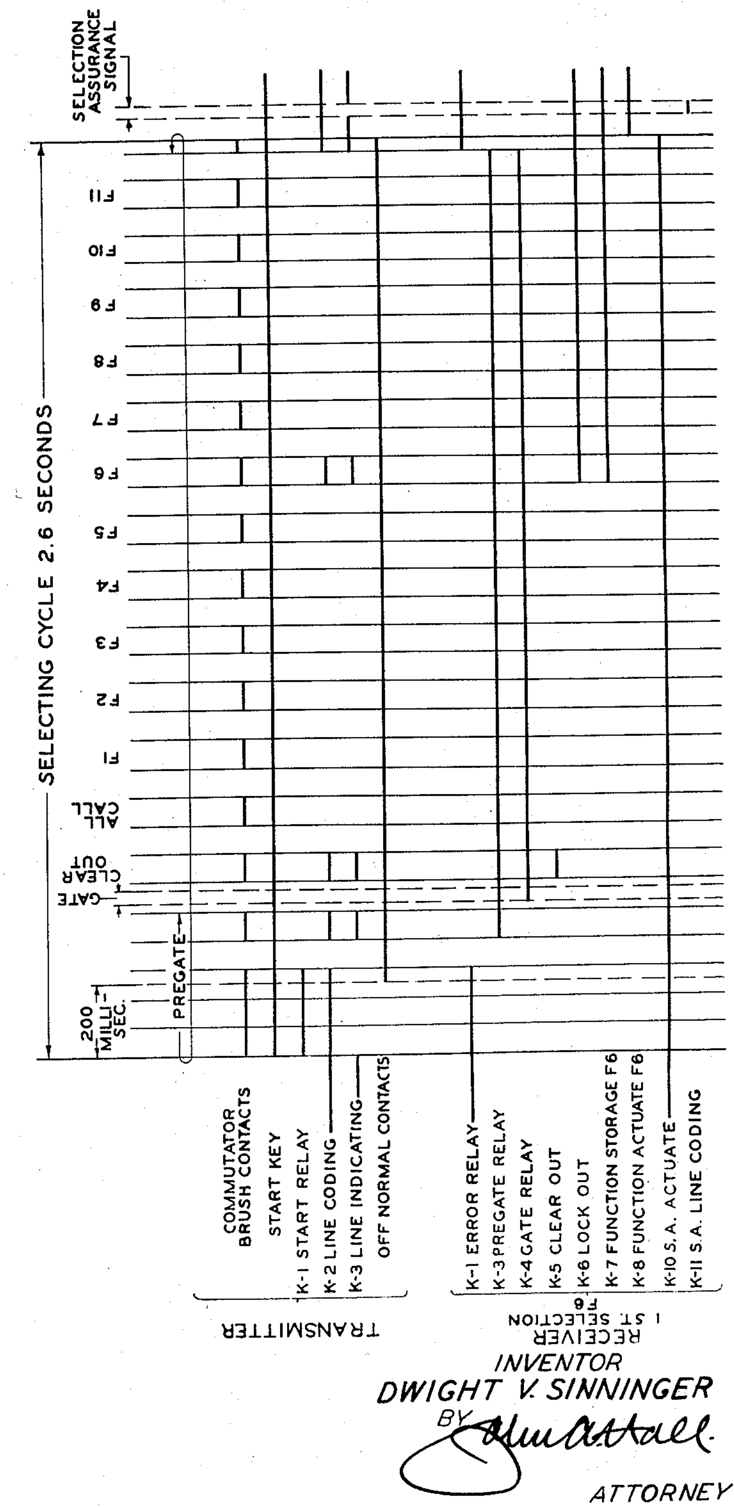
Figure 7:
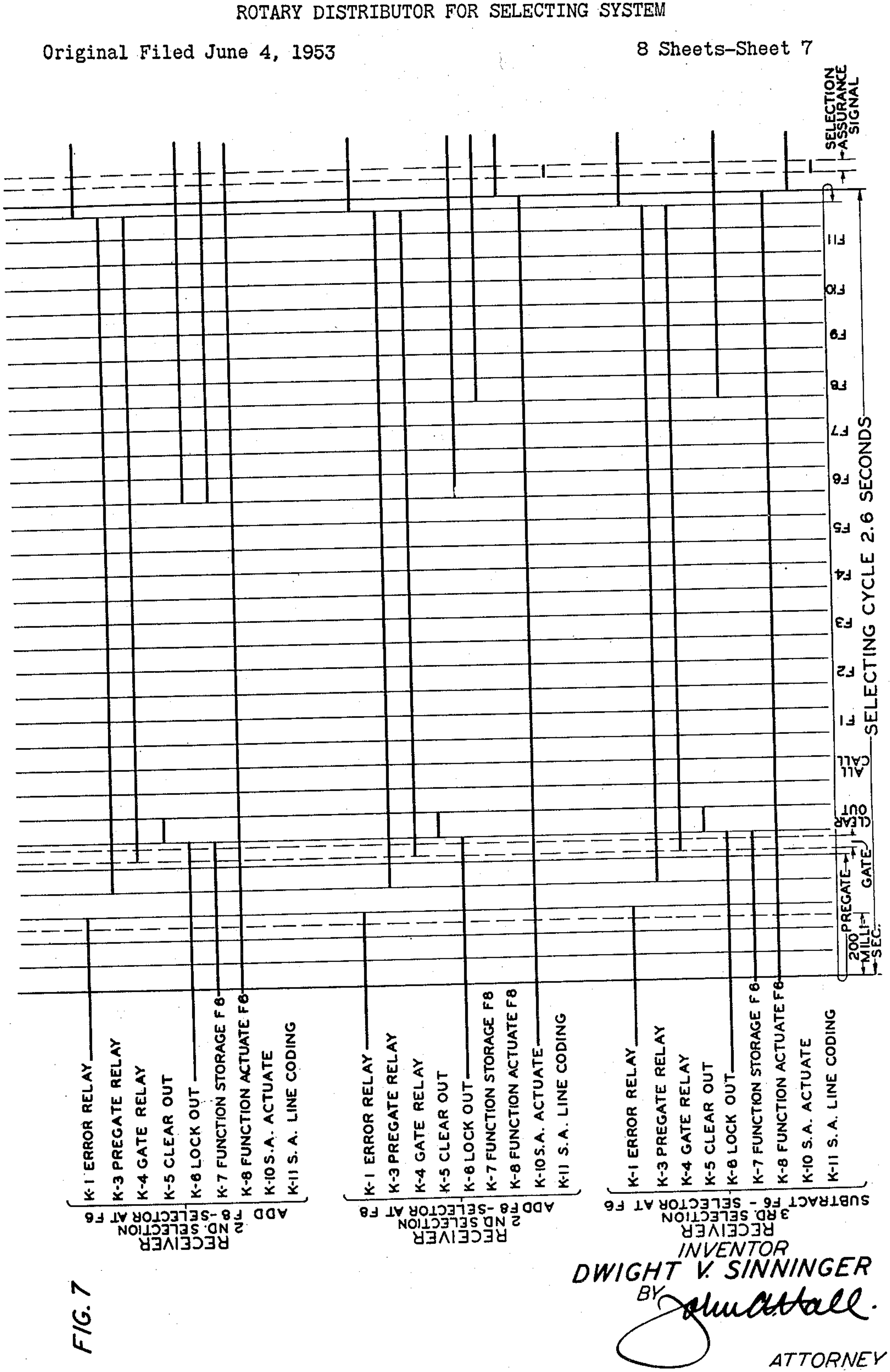
Figure 10:
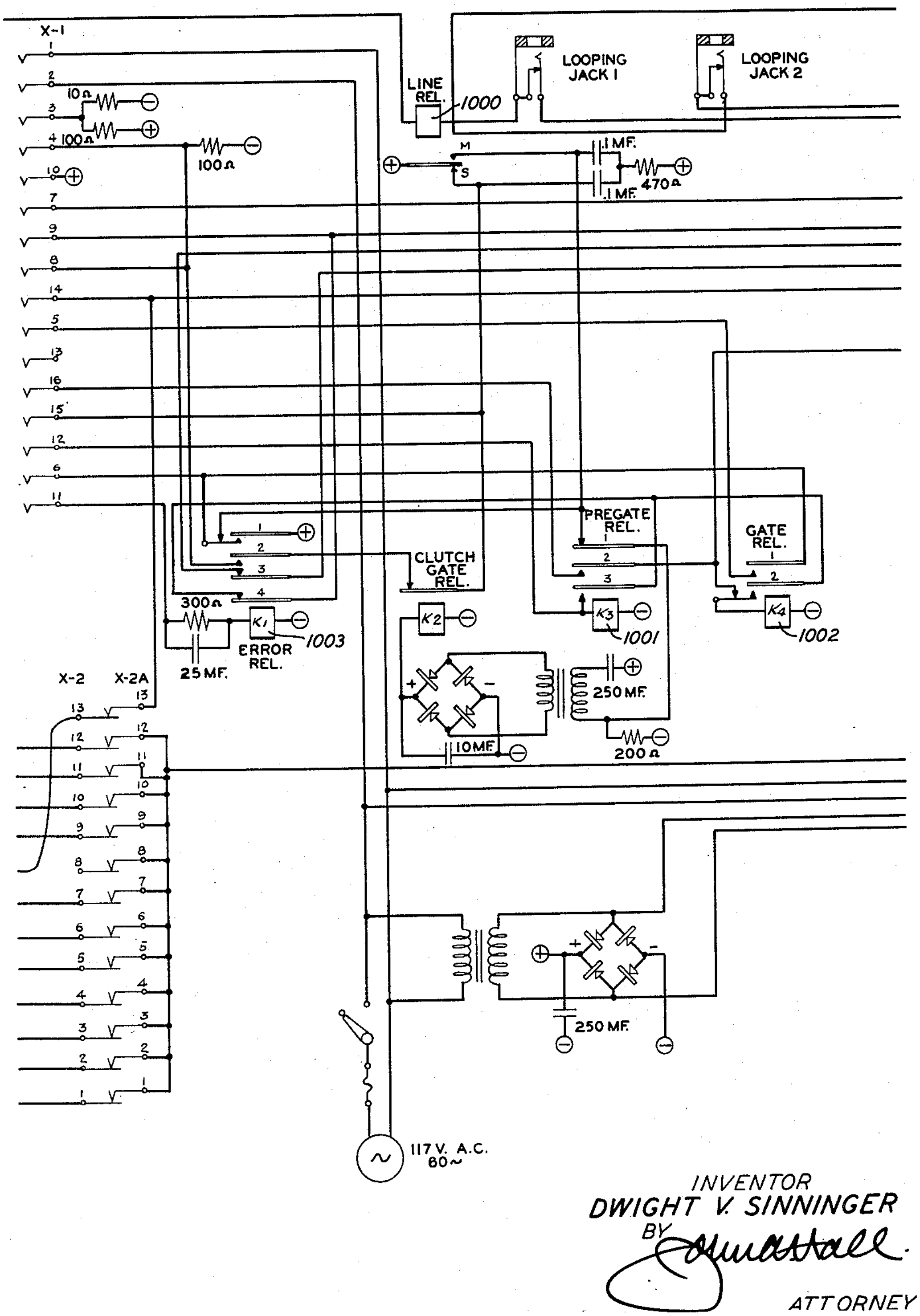

Fig. 6 and Fig. 7 with Fig. 6 placed above Fig. 7, constitute a time chart showing the operations of various devices at the transmitting and receiving stations during several representative selecting cycles;

Fig. 8 is a schematic drawing, partly in section, showing a released push button nad giving an indication of the direction of the effort in operating it;

Fig. 9 is a similar schematic drawing, partly section, showing a latch push button and giving an indication of the direction of the effort in releasing it;

Fig. 10 is a schematic circuit diagram similar to that of Fig. 4 and which may be substituted therefor to show how the gate relay and the clear out relay may be operated together thus releasing the segment of the distributor employed in the clear out function so as to provide an extra selecting function; and Fig. 11 is a fragmentary circuit diagram indicating the reset button connections and the Add Only connections wired to a single push button.

*The system*

Figure 1:
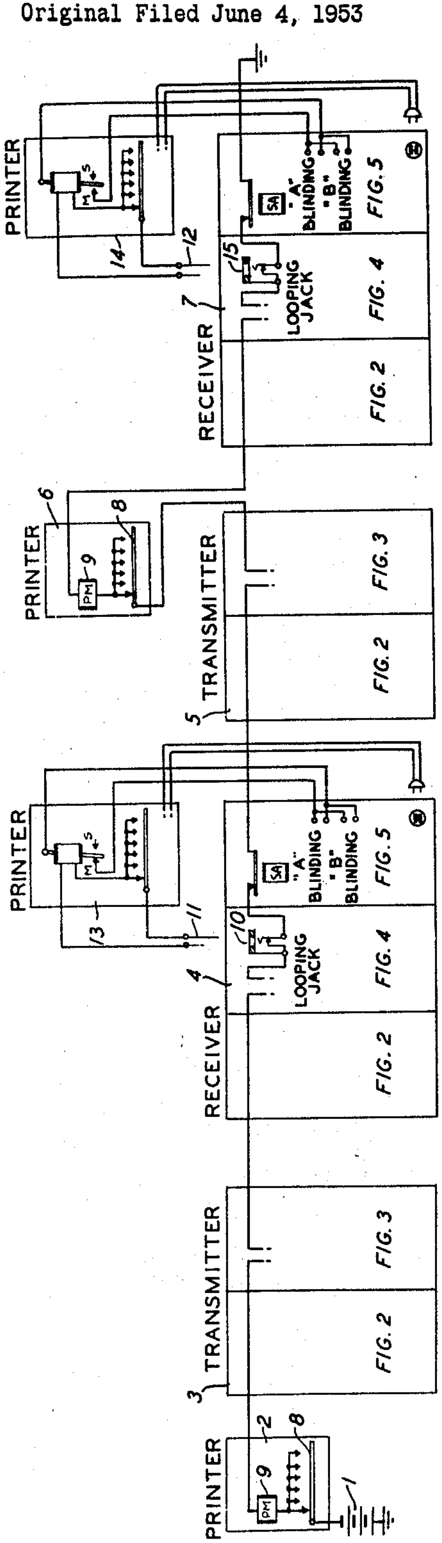
Fig. 1 is a schematic drawing, partly in the form of block diagrams, showing how Figs. 2, 3, 4 and 5 may be used to form a system embodying the present inventions.

Fig. 1 represents a selecting system in which a plurality of transmitter stations and a plurality of receiver stations may be included in a telecommunication channel. This channel extends from ground through the battery 1, through a printing telegraph unit 2, a transmitter station 3, a receiver station 4, another transmitter station 5, a printing telegraph unit 6, another receiver station 7, to ground. The printing telegraph stations 2 and 6 are represented conventionally each having a transmitter unit, such as 8, and a printer magnet 9. Each receiver station, such as the station 4 and the station 7, is provided with looping jacks, such as the jack 10 and the jack 15, into which plugs 11 and 12 respectively may be inserted to include the printing telegraph unit 13 and the printing telegraph unit 14 respectively in the circuit. The printers 2 and 6 being associated with transmitter stations will be active at all times, but the printers at the receiving stations are arranged to be powered through the circuits of the receiver stations since these printers may be used only when the stations have been selected and enabled. Each of these printers is connected to blinding arrangements within the receiver here noted only as "A" blinding and "B" blinding. Blinding consists of a connection from the armature of the printer magnet to its marking contact so that when the wires connected to these points are connected together within the receiver circuit, the printer will be unable to respond to any impulses transmitted over the line.

The arrangement may be varied to suit the service desired, that is, there may be one transmitter station and as many as eleven receiver stations, or there may be more than one transmitter station as represented in this figure. There may be, by way of example, a master transmitter station having a printing telegraph unit constantly active and minor transmitter stations each having a receiver station associated with it for the purpose of enabling a printer thereat. The operator at thte master transmitter station may, by the push button selection means of the present invention, select and enable any one or more of the printers at the distant receiving stations so as to establish communication between his printer and the said selected printers. All other printers will be blinded.

It will appear hereinafter that every printer, with the exception of those which have been selected and enabled, will be blinded except when the entire communication channel is idle. The "A" blinding consists of means to blind all printers during the transmission of selecting signals and the "B" blinding consists of means to blind a printer which has not been enabled by selection from a transmitting station. It may be convenient to provide a printer with either "A" blinding or "B" blinding, or both, or neither, the blinding connections being optional. Usually all printers are connected to the "A" blinding terminals and the "B" blinding is considered optional. Now printing telegraph messages may be transmitted from a distant station only when the unit is powered. If such a station has been enabled this consists of the operation of the corresponding function actuate means, usually in the form of a relay which will both open the "B" blinding circuit and will apply power to the printer. Each such station is equipped with a "Send" switch which operates alternatively to apply power to the printer, so that the operator may, by operating this switch, enable his printer to transmit. However, this will be ineffective if the line is in use and his printer is blinded so that the use of the "Send" switch is reserved for intervals when the line is otherwise idle, or if such particular printer is not connected for "B" blinding. Thus, any distant station may be excluded from the communication channel while it is in use but is not left helpless, since when the line becomes idle he may establish communication with the master station.

*The transmitter station.—The motor clutch distributor unit*

Figure 2:
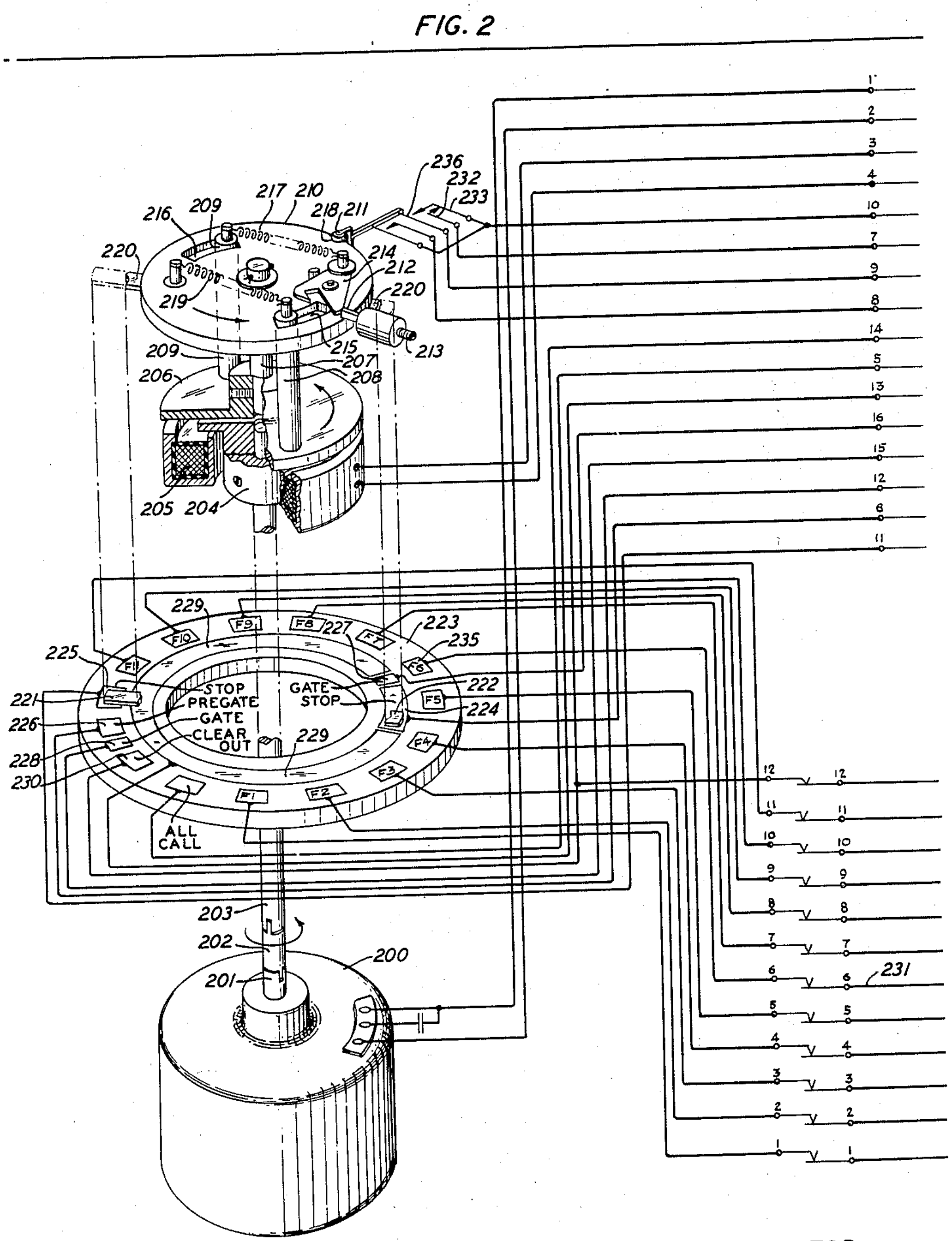
Fig. 2 is a drawing partly in the form of a schematic circuit diagram and partly in the form of an exploded perspective view of the motor clutch and distributor unit used in all stations both transmitting and receiving.
Figure 5:
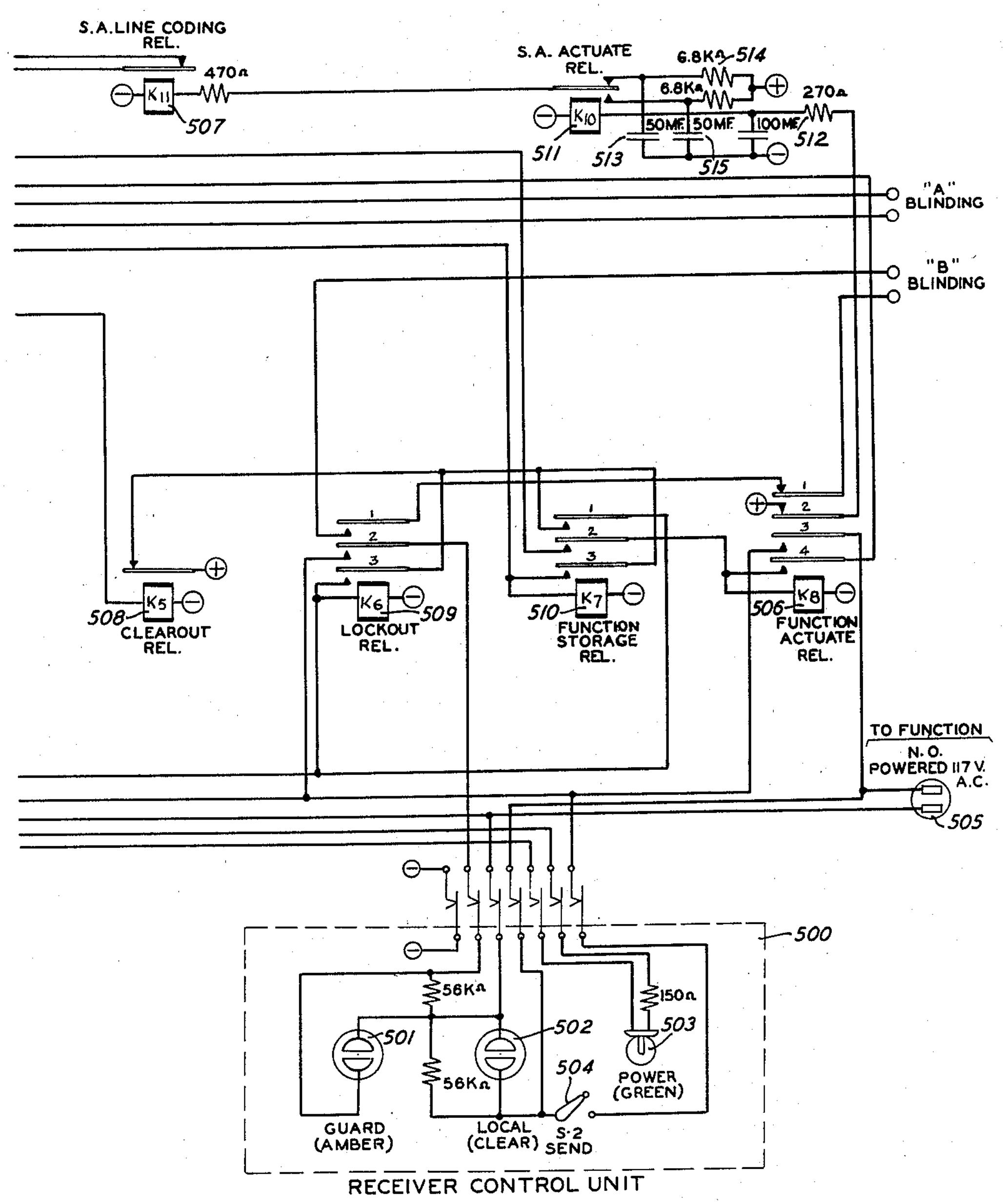

The transmitter station is represented in Figs. 2 and 3 and each of the receiver stations is represented by Figs. 2, 4 and 5.

Each of the stations in the selecting system is provided with a motor, clutch and distributor unit, such as that shown in Fig. 2. This unit consists of a motor 200 constantly operating at a constant speed from a source of alternating current. It is necessary that the various sources of alternating current used at the various stations have a substantially common frequency, but it is not necessary that such sources be in phase with one another.

The motor shaft 201 constantly operating is connected by a short shaft 202 having tangs at either end thereof disposed at right angles to each other to fit in slots in the motor shaft 201 and the shaft 203 of the distributor device. This is a conventional form of universal joint used in order to prevent binding of the shaft 203 when mounted in conventional manner without too great stress being put on accuracy and precision in the mechanical fabrication of the device. Mounted on the shaft 203 at the upper end thereof is a magnetic piece 204 constituting the core of an electromagnet. This electromagnet is provided with a coil 205 shown partly in cross section. Located in cooperative relationship with the core 204 and the coil 205 is an armature 206 which comes into frictional engagement with the core 204 when the coil 205 is energized and rotates the unit consisting of the shaft 207 and the two pins 208 and 209. It will be understood that the two shafts 203 and 207 are mounted in axial alignment and that the armature 206 is normally held by spring means out of frictional engagement with the core 204. The mounting of the shaft 207 and the spring means being conventional are not shown in the interest of clarifying the showing of and the description of the operation of this device. Loosely mounted on the shaft 207 there is a disc 210 having a notch 218 into which the roller 211 will drop when this disc has reached its normal position. The roller 211 is mounted on an off normal spring pile up and will serve as a means for holding the disc 210 in a normal position. It should be noted that the disc 210 is adapted to rotate in a counterclockwise direction and that, in a way of speaking, the notched disc is dragged away from the off normal spring pile up rather than being forced against it, a feature in design making for a better mechanical operation thereof.

A latch 214 is mounted on the disc 210 and is impelled by a spring 217 to rotate in a counterclockwise direction. The disc 210 is shown in its normal position. In this normal position a stop pin 212 adjustable by the screw 213 will hold the latch 214 at such a position that the pin 208 as it moves toward the right will drop into the jaw thereof.

When the coil 205 of the clutch magnet is energized, the armature 206 is thrown into frictional engagement with the core 204 so that the armature starts to revolve in a counterclockwise direction. The pin 208 moves through a slot 215 and a similar pin 209 moves through a similar slot 216 in the disc 210 without moving this disc. As the rotation continues, the pin 208 will enter the jaw of the latch 214 and both pins will come to bear on the distant edges of the slots through which they protrude. Thereupon, the disc 210 will be impelled forward in a counterclockwise direction and immediately the disc leaves its normal position the latch 214, now freed by the stop 212, will hook its jaw about the pin 208 under control of the spring 217 so that the armature of the clutch 206 and the disc 210 are firmly and mechanically locked together. This is necessary to prevent a false movement of the disc 210 forwardly, since there is no restraint on the disc 210 after the off normal springs have been lifted, and it would, under the influence of the springs 217 and 219, tend to jump forward in a counterclockwise direction.

The disc 210 is a means for mounting a commutator brush 220 whose contact making ends 221 and 222 are shown projected as resting on certain commutator segments. As the disc 210 revolves, the commutator brush 220 will in turn pass over the entire arrangement of commutator segments until the latch 214 is again engaged by the stop 212. This may be so adjusted that the pin 208 will be released from the jaw of the clutch 214 exactly as the roller 211 falls into the detent 218 in the edge of the disc 210. It will hereinafter be noted that as the roller 211 makes this movement the off normal contacts controlled thereby will open the circuit of the clutch magnet 205 so that the clutch will release from the core 204 and terminate its movement. Since the armature 206 is now not impelled forward in a counterclockwise direction it will, under the influence of the springs 217 and 219, make a short clockwise movement so as to move the pins 208 and 209 back into the positions shown.

Mounted in cooperative relationship with the distributor brush 220 is a distributor face 223 on to which a number of segments are fixed. In the normal position of the device as shown, the brush 220 interconnects a stop segment 224 of the inner ring and a stop segment 225 of the outer ring. As the device begins to move in a counterclockwise direction, the brush 220 next makes a connection between the stop segment 224 and the pregate segment 226. It will be understood that as the brush passes from the segment 225 to 226 it will pass over an insulating segment at which time the stop segment 224 will not be connected through the brush 220 to any other part of the circuit.

Following this movement the brush will make a connection between a free narrow gate segment 227 in the inner ring and a similar narrow segment 228 in the outer ring known as the gate segments. Next, as the brush 220 moves it will make a connection between the inner ring 229 which is now continuous for the rest of the segmental positions and the clearout segment 230.

In an alternative arrangement described hereinafter in connection with Fig. 10, this clearout segment 230 may be used for another purpose, such as an extra selection.

As the brush revolves it will then in turn pass over the various segments marked "All Call" and "F1" to "F11" inclusive.

The operating connections for this device end in a plug arrangement having sixteen plug tongues shown in the upper right hand part of the figure and which may be plugged into a cooperating jack within the transmitter chassis. The function connections from the segments F1 to F11 inclusive end in another connecting device in female units marked 1 to 12 inclusive in the lower right hand portion of the drawing. This constitutes part of a cross connecting device so that where the unit is used in a receiving station cross connecting wires made fast to individual plugs may be inserted in these units for the purpose of adjusting the station to any desired selecting arrangement.

In Fig. 3 the female part of the plug device for the distributor unit is shown in the upper left hand portion of the drawing and another cross connecting plug arrangement for the function connections is shown in the lower left hand portion of the drawing. It will be noted that in the transmitting station arrangement the cross connection by the jumper wires, such as the wire 231, is a straight and orderly arrangement, but in the receiving station this arrangement may be varied by jumping the plug ended wire to a function storage relay.

*The transmitting station.—Push button and signal unit*

A push button and signal lamp unit mounted in a separate chassis by a plug and cord arrangement here generally denoted by the broken line rectangle 304, is provided for the transmitting station. This unit comprises fifteen push buttons, four signal lamps and a pair of relays. Before going into the operation of the device, however, it will be convenient at this point to describe the general scheme of operation of the push buttons as indicated in Figs. 8 and 9. Fig. 8 shows one of the push buttons in its unoperated position. It consists of a button 20 protruding through a hole in the chassis 21 and being held by a stop 22. The chassis at this point is bent inwardly to afford a latch tongue which will prevent a mere upward or lateral thrust on the button from releasing it. The button 20 is provided with an inclined slot 23 cooperating with the bent in portion of the chassis, as indicated in Fig. 9.

The button has a shaft 24 passing through an appropriate aperture in a frame member 25 and pressed toward the left by the spring 26. Mounted on this shaft 24 are two buttons 27 and 28 of insulating material into which contact segments 29 and 30 respectively are secured. Cooperating with the buttons 27 are two contact springs 31 and 32 which, as indicated in Fig. 9, will be interconnected when the button is pushed into its operated position. This constitutes a circuit maker responsive to the operation of the button. In like manner, two springs 33 and 34 cooperate with the conducting piece 30 so that during the movement of the button a circuit will be closed therebetween. This circuit is opened as the button reaches its final position so that this circuit maker is necessary for providing a passing or transiently closed circuit.

The outstanding feature of this button arrangement is that when the button is pushed inwardly and slightly downwardly, it will go to its operated position and latch over the edge of the chassis. Due to the inclined slot cut therein, it will not readily respond to a mere upward or lateral thrust, as might happen inadvertently, but it will require a definite inward and upward push to release it.

In the push button arrangement within Fig. 3 these push buttons, such as the push button F1 is shown as consisting of four springs. The upper pair ends in a flat surface to indicate that this pair of contacts is operated to make a contact after the button has been pushed in and that the button remains in its operated position. The lower pair of contacts, however, shows a narrow operating portion to indicate that this is a passing contact and that such contact is made only during the movement of such button either inwardly, to its operated position, or outwardly, to its released position.

*The transmitter station circuit*

When a transmitter station, such as that shown in Figs. 2 and 3, is placed in operation, a switch 305 is closed to connect a source 306 of alternating current to the device. One branch of the circuit thus closed leads to the motor 200 and places this into operation so that thereafter as long as the station is enabled this motor will continue to operate. Another branch of this alternating current circuit leads to a transformer 307, the secondary of which is connected to a rectifier device 308. In line with conventional power pack practice, the minus terminal of this rectifier device is connected to the chassis and the plus terminal is used as the effective source of power for the various operations thereof. At various points in the circuit the symbols for these positive and negative terminals are shown as circles enclosing a plus or a minus sign and it will be understood that such symbols indicate connections to this source of power or battery.

Under condition where this station is not in operation, the K4 relay 303 by its armature and back contact closes the two line terminals together. This is known as a fail safe relay, since it is connected to the plus terminal of the power supply and holds the line in operating condition but closes the two terminals thereof together when the power supply fails.

Under normal conditions a circuit will be closed from the positive source of battery through the number 6 terminal of the plug and jack arrangement thence through the segment 224, the brush 220, the segment 225, the number 11 plug and jack connection, the resistor 309, the winding of the K2 line coding relay 301 to the chassis ground. The K2 line coding relay therefore connects the branch 310 of the line through the back contact and armature 1 of the K1 start relay 300, the armature and front contact of the line coding relay 301, the winding of the K3 line indicating relay 302 to the other branch of the line 311. Thus, if the line is otherwise closed, the K3 line indicating relay 302 is operated at this time and this will connect the chassis ground through the armature and front contact of relay 302 through the line lamp 312, the resistor 313 to the source of power so that the glowing of this lamp will indicate that the line is in proper operating condition. Also the lamp 314 will glow in a circuit from the chassis ground, the lamp 314, the resistor 313 to battery, thus indicating that the power has been applied and that the power pack is active.

Looking for a moment at Fig. 6 and under the first group of time indications, bracketed "Transmitter," it will be noted that the K2 line coding relay and the K2 line indicating relay are both shown as active prior to the start of a selecting cycle. Let it now be assumed that the F6 button 315 is operated to select and enable the function activate means at the corresponding station. During the movement of this button a circuit is established from the chassis ground through the K5 prompt relay 316, the transiently made lower contact maker of the button 315, plug contact 7 through the normally connected springs 232 and 233 of the off normal spring switch, plug contact 10 to the source of battery. The prompting relay 316 operates and now completes a circuit through its own winding, start lamp 317, the front contact and armature of the K5 prompt relay 316, the reset button 318 and thence over the circuit traced through the off normal springs 232 and 233 to the source of battery so that this K5 relay locks into operated position and remains there as the button 315 moves to its final operated position. As the prompt lamp 317 glows, it indicates to the operator that the start switch may be operated. This start switch may be pushed for a short time or it may be pushed all the way in and latched. In the chart of Fig. 6 the start key is shown as having been pushed in and left there so that it is still operated after the termination of the selecting cycle which it has started.

Immediately upon the operation of the start key, a circuit is extended from battery through the number 10 plug and jack elements, the off normal springs 233 and 232, the number 7 plug and jack elements, the reset key 318, the armature and front contact of the K5 relay 316, the contacts of the start key 319, the winding of the K1 start relay 300 to the chassis ground. This relay immediately operates and locks through its front contact and armature 3, the number 11 plug and jack element, segment 225 of the distributor, brush 220, segment 224 of the distributor, plug and jack element 6 to the source of battery. It is evident that this start relay K1 will therefore remain locked in its operated position until the brush 220 moves off the stop segment 225. During the operation of the K1 start relay the communication channel will be opened so as to affect all of the receiving stations. It will be hereinafter shown how this prolonged space signal will be used to start the distributors in all of the receiving stations.

The slots 215 and 216 in the clutch disc 210 are of such dimensions that the pins 208 and 209 will move for 200 milliseconds before engagement is made with the disc 210 and that disc is started in the movement. This is indicated in the time chart of Fig. 6 where the off normal contacts are shown to operate at the end of the 200 millisecond interval. Forty milliseconds thereafter, when the brush 220 leaves the stop segment 225, the circuit for the start relay 300 will be opened and both this relay and the line coding relay 301 will release. The first line of time intervals shown in Fig. 6 is that of the commutator brush contacts and it will be noted that these contacts open at forty milliseconds beyond this first prolonged interval of two hundred milliseconds. Thereafter the line coding relay will operate when the brush 220 encounters the pregate segment 226 and a circuit, which will be described hereinafter, is closed for the pregate relays for all of the receivers. Again, the K3 line indicating relay and the K2 line coding relay are operated when the clear out commutator segment 230 is being traversed but no other circuit will be provided for these relays in the case which we have assumed until the F6 segment is reached.

It may also be noted that as soon as the off normal contacts have operated the prompt relay 316 will be released and the prompt lamp 317 will cease to glow. This is because the connection between the off normal springs 232 and 233 is broken immediately the disc 210 begins to revolve. Thereafter and until the disc 210 has made a complete revolution, a battery connection will be extended through the number 10 plug and jack element, the spring 233 and the spring 236 of the off normal switch to element 9 of the plug and jack arrangement which is connected also to the element 4 of the plug and jack arrangement so as to maintain the energization of the clutch coil 205 after the original circuit of the armature 2 and front contact of the K1 start relay 300 is opened. Thus the clutch is maintained in operation until the disc 210 makes a complete revolution and the roller 211 drops into the notch 218 of this disc.

It will appear hereinafter that as the selection is made at station number 6 and the function activate means thereat is operated, a very short pulse known as a selection assurance signal is transmitted back over the line. This will cause the line indicating relay 302 operated at the end of the selecting cycle to release for an instant. It will further be noted that at the end of this selecting cycle a circuit may be traced from plus battery, number 10 jack and plug unit, off normal springs 233 and 232, number 7 plug and jack unit, number 5 plug and jack of the push button chassis, relay 323, resistance 322, condenser 321, resistance 320 to the chassis ground (connected to the main chassis ground through jack and plug unit 20). Due to the high resistance 320 (39,000 ohms) the condenser 321 starts to charge slowly, thus providing a short opportunity interval before it becomes charged beyond its capacity to cause the operation of relay 323. If therefore the line indicating relay 302 releases during this interval, the high resistance 320 will be shunted by a direct connection to the chassis ground at the armature of relay 302 and the condenser 321 will be charged at a high rate, sufficient to cause the operation of relay 323 which now locks from the chassis ground through the selection assurance lamp 324, the resistor 325, the front contact and armature of the K6 relay 323 to the permanent battery connection at element 10 of the plug and jack arrangement. Therefore, it will appear that the selection assurance lamp 324 will glow and will remain in this condition until the locking circuit for the relay 323 is opened at the beginning of another selecting cycle.

Unless the selection assurance pulse arrives within this opportunity interval, the condenser 321 will have become charged and the relay 323 cannot be operated. This provides a safeguard against operation of the selection assurance relay by random space pulses.

It will also be noted that while the distributor is off normal the condenser 321 will be discharged slowly through resistances 331 and 320.

It is to be noted that when the start relay K1 is operated a circuit may be traced from battery through armature 2 and front contact of the relay 300, thence through element 4 of the plug and jack arrangement, the coil 205 of the clutch magnet, element 3 of the plug and jack, thence through the resistor 326 to the chassis ground. The resistor 326, by way of example, is of low resistance compared to the resistance of the winding of the relay K4 in parallel with the resistor 327, so that this circuit is effective to operate the clutch magnet 205. When the start relay 300 is released, however, a current will now flow from the source of battery through the network of the winding of the K4 relay 303 in parallel with the resistor 327, thence through the element 3 of the plug and jack, the winding 205, the element 4 of the plug and jack, the resistor 328 to the chassis ground. The current flowing in this circuit is very small but it will be noted that it is in the opposite direction to the current which flows through the coil 205 on the operation of the start relay 300. This is known as a retentivity neutralizing circuit, since it sets up a small field in opposition to the operating field of the clutch and thus helps to speed the action of release.

*Add Only operation*

The Add Only button 330 may be used when the operator at a transmitting station wishes to make a selection involving the addition of a new station to an already established pattern of enabled stations. Where there is but a single transmitting station this is not necessary for the said pattern will be that of the operated station buttons, but where there are several transmitting stations, one operator, in order not to disturb such a pattern established by another transmitting station operator must use his Add Only button. This button effectively opens the circuit made when the commutator brush 220 makes contact with the clear out segment 230 whereby the operation of the clear out relays in all the receiving stations is prevented. It will be remembered that the usual operation is to release all of the function storage relays and to then reoperate those corresponding to the station which it is wished not to disturb. Since in a system where there are several transmitting stations, one operator cannot know which buttons another operator may have pushed, he avoids releasing any of the function storage relays by operating the Add Only button 330 in addition to the particular button corresponding to the station he wishes to add. Button 330 opens the circuit of commutator segment 230.

*Reset operation*

If a transmitting station operator pushes any function button or releases one already operated, he will power the start key and cause the prompt lamp 317 to glow. This lamp will continue to glow in the locking circuit of the prompt relay 316 and will indicate to the operator that an operation of the start button 319 is in order. However, if the operator has made a mistake and wishes to overcome such an error, he may momentarily push the reset button 318 and this will open the locking circuit for the prompt relay 316, thus releasing the prompt lamp 317 and disconnecting power from the start button 319. The reset button, as indicated, is a nonlocking button.

*Combined Add Only and Reset*

It has been stated hereinbefore that a unique operation may be had by combining the Add Only connections and the Reset connections in a single button while at the same time making another button available for some other purpose. This is indicated in Fig. 11 by the connections made to the combined button 331. The upper pair of springs provide a normally closed connection between the clear out segment 23 and the K2 line coding relay 301. When this button is operated and latched this connection will be broken so that the clear out relays in the receiving stations will not be operated. The lower pair of springs of this key indicate a normally closed circuit from battery, the off normal springs 233 and 232, the normally closed button contacts, the armature and front contact of the prompt relay 316, the prompt lamp 317, the winding of the prompt relay 316 to the chassis ground. This circuit will be broken during the operation of the button but will be closed in either the operated or the released position thereof. If the reset operation is to be carried out, the button may be partially operated or it may be operated and then released to unlock the prompt relay 316. If the Add Only operation is to be carried out, then the key is operated and latched. During its movement the prompt relay 316 is released and the prompt lamp 317 is extinguished. However, this serves as a warning or a reminder that the next necessary operation of some station button has not been carried out. When such other button has been operated the prompt relay 316 will be operated again and the start key will be supplied with power, whereupon the regular operations described will be carried out.

*The receiving station circuit*

The receiving station may be represented by Figs. 2, 4, and 5 placed as shown in Fig. 1, or by Figs. 2, 10 and 5, Fig. 10 being used in place of Fig. 4. In the first arrangement there are commutator spaces for a clear out signal and twelve other selecting signals whereas in the latter arrangement the clear out signal has been combined with the gate signal thus providing an extra station selection space, as indicated by the connection to the number 12 cross connecting jack.

Each receiving station, like the transmitting station hereinbefore described, has a source of alternating current power which may be turned on by the switch 400. One branch of this circuit goes to the numbers 1 and 2 plug and jack connections leading to the motor 200 in Fig. 2 so that this motor is powered and runs continuously. Likewise, a branch of this power source leads to a transformer 401 which supplies alternating current to the rectifier device 402 to provide a battery source from the chassis ground 403 to the positive terminal 404. The symbols in the form of circles enclosing a plus or a minus sign in various parts of Figs. 4 and 5 indicate connection to these terminals 403 and 404.

The receiving station comprises a chassis containing the motor clutch distributor device of Fig. 2 and the relays of Figs. 4 and 5 and a small chassis connected thereto by a plug and cord arrangement which is indicated by the broken line rectangle in Fig. 5. This small apparatus unit contains three signal lamps, the neon lamp 501 for indicating that some one of the receiving stations has been enabled, the neon lamp 502 for indicating the fact that the power has been turned on at this station and the filament lamp 503 which indicates that the rectifier device 402 is active. This small apparatus unit 500 also contains the send switch 504 which when turned on will supply power to an associated apparatus unit, such as a printing telegraph unit, whether this unit be enabled by a function actuate means or not. It may be noted that a conventional electric light outlet 505 is supplied and into which the plug from the telegraph unit may be inserted. The lower terminal of the outlet 505 is connected to one side of the alternating current supply line, whereas the other terminal must find a circuit, either through the send switch 504 or through the front contact and armature 3 of the K8 function actuate relay 506. The manner in which this relay is operated will be explained hereinafter.

The line connections to the receiving station comprise the line 405 leading to the line relay 406, thence in series through the looping jacks 407 and 408 and the back contact and armature of the selection assurance line coding relay 507, thence back over the line wire 409. These line wires are connected in the system as indicated in Fig. 1. Normally the line relay 406 will be operated so that a connection is afforded from the armature of line relay 406 through its mark contact, the back contact and armature 1 of the K3 pregate relay 410 to one terminal of the primary coil of transformer 411, the other terminal of which leads through a condenser 412 to the positive source of battery. The connection through the resistor 413 to the chassis ground is thus blanked out so that no current can flow through the primary of the transformer winding 411. If this line relay begins to vibrate, as under the influence of a train of printing telegraph signals, then as the armature of the line relay 406 goes to its spacing contact the circuit just described will be opened and charging current will flow from the positive source of battery through the condenser 412, the primary coil of the transformer 411, the resistance 413 to the chassis ground. As the armature of the line relay 406 goes to its marking contact, this circuit will be changed and the charge of the condenser 412 will be drained off to the positive battery connection at the armature of the line relay.

This is an asymmetrical circuit. Due to the resistance 413 the charging of the condenser 412 is at a comparatively slow rate and no effective current is induced in the secondary of transformer. However, the constants of the circuit are such that the discharge of the condenser 412 is at a high rate and is oscillatory in form. Therefore, the effect is to create an alternating current in the secondary of the transformer 411, whereby the K2 clutch gate relay 415 becomes operated. The operation of the K2 relay 415 opens a circuit which may be traced from the positive battery source, the armature and space contact of the line relay, the armature and back contact of the K2 relay, armature 2 and back contact of the K1 error relay 416, the number 4 jack and plug arrangement leading to the coil 205 of the clutch back through the number 3 plug and jack arrangement through the low resistance 417 to the chassis ground, whereby the operation of the clutch is prevented during the transmission of these signals.

If the first movement of the line relay 406 is a spacing signal following a marking signal of at least one-third of a second, then the clutch will operate since the clutch gate relay 415 remains unoperated. During this one-third second marking signal the discharge of the condenser 412 will have been completed and the current derived by the rectifier device 414 will have subsided to a value insufficient to maintain relay 415 in operation. As the armature of the line relay 406 goes to its spacing contact the condenser 412 begins to charge, but the charging current is a gradually decreasing current and will not induce any effective output current in the secondary of the transformer 411. If this space signal is less than 200 milliseconds in duration then on the next mark signal the relay 415 will be operated and the clutch will be deenergized and will return to normal. If, however, the line is opened by the start signal from the transmitting station, the clutch 205 will be operated and the motor clutch distributor device at each one of the receiving stations will start into operation. If this is followed after some 320 milliseconds by a mark pulse, transmitted over the line from the transmitting station and due to the arrival of the brush 220 on the pregate segment 226, then a circuit will be established for the pregate relay 410 in the receiving station which may be traced from the chassis ground through the K3 pregate relay 410, the number 12 jack and plug arrangement, the pregate segment 226, the brush 220, the stop segment 224, number 6 plug and jack arrangement through the normal contacts of armature 1 of the error relay 416 to the source of battery so that the pregate relay will become operated. The pregate relay locks through its front contact and armature 3, the back contact and armature 4 of the K1 error relay, released as the brush 220 leaves the stop segment 221, through number 9 jack and plug unit, the off normal springs 236 and 233 to the plus battery on number 10 plug and jack unit.

It may be noted at this point that the connection between the line relay marking contact and the primary of the transformer 411 is broken at armature 1 of the pregate relay 410 to avoid any false operation of the K7 function storage relay 510. Were this connection not opened then, if the line relay had gone to mark in the F5 interval, the condenser 412 would have been discharged and a positive potential might be present on the armature 1 of the pregate relay 410 of a value sufficient (due to the slow charging of condenser 412 through resistance 413) to operate the function storage relay. However, through the breaking of this circuit by the operation of the pregate relay 410 any such false operation is avoided.

The pregate mark pulse is followed by a space pulse as the brush 220 at the transmitting station moves from the pregate segment 226 to the clear out segment 230. In the receiving station the brush movement in this direction traverses the gate segment 228 and at the receiving station thus completes a circuit from the chassis ground through the gate relay 418, the armature 2 and front contact of the K3 relay 410, the number 16 plug and jack combination to the inner gate segment 227, the brush 220, the outer gate segment 228, the number 15 plug and jack connections, the space contact of the line relay 406 to the positive source of battery. Thus, if the pregate mark pulse transmitted from the transmitting station arrives properly at the receiving station and causes the operation of the pregate relay, then the following space signal sent from the transmitting station will be translated by the distributor at such receiving station into a positive pulse to operate the gate relay 418.

The operation of the pregate relay 410 opens the circuit to the primary of the transformer 411 for the purpose above stated and also effectively prevents the operation of the clutch gate relay 415. It will thus be noted that there are two gate relay devices in the receiving station, each of which controls the other. The start pulse of a selecting cycle comprises first a prolonged space pulse of 320 milliseconds followed by an 80 millisecond mark pulse in turn followed by an 80 millisecond space pulse. A prolonged mark pulse preceding this space pulse is designed to quiet the rectifier device 414 so that during this long space pulse the distributor may be moved off normal where any operation of the clutch gate relay will be without effect. On the other hand any other train of pulses lacking a long space pulse to start with cannot efficiently start the brush 220 into operation for before the distributor can be moved off normal the clutch gate relay will operate and disable the clutch. Some short space pulse might cause an operation of the shaft 207 but anything less than 200 milliseconds will return this to its normal position. Thus the clutch gate relay 415 will take over command of the circuit very shortly after any train of pulses has started to be transmitted over the communication channel.

Under ordinary conditions the error relay 416 is normally operated in a circuit from the chassis ground, the winding of the K1 error relay 416, the resistor 419, the plug and jack element number 11 leading to the stop segment 225, the brush 220, the stop segment 224, the number 6 plug and jack element, the normal contacts of armature 1 of the K1 error relay 416, the mark contact of the line relay and thence through the armature thereof to the source of battery. The error relay operates and locks in a circuit which may be traced from the number 6 plug and jack element through the front contact and armature 1 of the K1 error relay to the source of battery. This circuit will be maintained until the brush 220 breaks the connection by moving off the stop segment 225. Thus, as the line relay 406 moves to its space contact for the prolonged space signal forming the first part of the selecting cycle, the clutch 205 will be energized. After a 200 millisecond interval plus another 40 milliseconds for the brush 220 to leave the segment 225, the circuit for the error relay will be opened and this relay will return to its unoperated position. Eighty milliseconds thereafter the pregate relay 410 will be operated as described and then the device will continue in operation until a complete selecting cycle has been performed.

In this selecting cycle the first operation thereof will be a connection completed from the armature and mark contact of the line relay, the normal contacts of armature 1 of the K1 error relay, the armature 1 and front contact of the K4 gate relay 418, number 5 plug and jack connection, the inner ring segment 229, the clear out segment 230, the number 13 plug and jack element, the winding of the K5 clear out relay 508 to the chassis ground. Thus the K5 relay operates transiently as the brush 220 is passing over the clear out segment 230 and at this time any relay, such as the K6 lock out relay 509 or the function storage relay 510, which may be held to the source of battery supplied by the clear out relay, will be released. Immediately after the brush 220 leaves the clear out segment 230 the K5 clear out relay 508 will be released and the holding battery will be placed back on the armatures of the lock out and function storage relays.

The first selecting segment passed over by the brush 220 is the All Call segment. This segment at all receiving stations is connected to the function storage relay thereat so that if the All Call button at the transmitting station has been operated, then all stations will be called in.

As indicated in Fig. 4, the number 6 function is cross connected for active duty in this particular station. Therefore, when the brush 220 gets around to making contact with the F6 segment 235, a connection will be established from the source of battery on the armature of the line relay through its mark contact over the circuit hereinbefore traced to the brush 220, through the segment 235, the number 6 cross connecting arrangement through conductor 231 to the winding of the K7 function storage relay 510 to the chassis ground. The K7 relay 510 operates and locks through its front contact and armature 3 to the battery on the armature of the clear out relay 508.

At the end of the operation as the motor clutch distributor device reaches its normal position and the off normal contacts thereat are returned to the position shown, a circuit is established from battery, the number 10 plug and jack element, the springs 233 and 232 of the off normal switch, the number 7 plug and jack element, the front contact and armature 2 of the function storage relay 510, the winding of the K8 function actuate relay 506 to the chassis ground. This relay operates and locks through its front contact and armature 4, number 9 jack and plug element through the off normal spring 236 and the spring 233 prior to the movement of the off normal springs and thence through the number 10 plug and jack to the source of battery. Immediately the off normal springs go into the position shown, the original circuit for the function actuate relay 506 is made effective through the armature 2 and front contact of the function storage relay 510 and the springs 232 and 233 of the off normal set.

It will be noted that hereinafter when the device of Fig. 2 is operated and the original circuit for the function actuate relay 506 is opened, its holding circuit through its front contact and armature 4 is closed in the same movement so that this relay will remain in operation.

In the case where the K8 relay has been operated and it is to be released by a selecting cycle, then the corresponding function storage relay 510 will be released on the clear out signal and will not be reoperated. Therefore, as the off normal springs move back into their normal position at the end of a selecting cycle, the holding circuit for the K8 relay will be opened at that time and that relay will release.

A retentivity neutralization circuit may be traced from the positive battery through resistor 422, number 3 jack and plug element, clutch magnet coil 205, plug and jack element 4, the resistor 421 to the chassis ground. It may be noted, by way of example, that both the resistors 421 and 422 are of 100 ohms each, while resistor 417 which functions in the energization of the clutch magnet coil 205 is of 10 ohms.

*Selection assurance signal*

Normally a circuit may be traced from chassis ground through the K10 selection assurance relay 511, the resistance 512, the armature 2 and back contact of the K8 relay 506 to a source of battery. When, at the end of a selecting cycle, the K8 relay operates, the circuit for the K10 relay is opened and this relay releases. Now both the front and the back contacts of this relay are connected to a resistance and condenser circuit so that the movement of the armature of this relay in either direction will transmit a pulse in the winding of the K11 relay 507 which will cause this relay to operate transiently. When the K10 relay, for instance, is normally operated, the condenser 513 will be in a charging circuit from the chassis ground through the condenser 513, the resistance 514 to battery. As the armature of the K10 relay 511 moves to its back contact the condenser 513 is discharged in a circuit from the chassis ground, condenser 513, armature and back contact of the K10 relay 511 and the winding of the K11 relay 507 to the chassis ground. Likewise, when the armature of the K10 relay 511 rests on its back contact the condenser 515 becomes charged so that as the K10 relay is operated by a release of the function actuate relay 506 the K11 relay is again operated transiently. Each transient operation of the K11 relay transmits a single space pulse over the communication channel to operate the selection assurance lamp at the transmitting station.

*Blinding*

At the left hand portion of Fig. 5 there are two terminals marked "A Blinding." It will be noted that these two terminals are connected together by the back contact and armature 3 of the error relay 416. Since this relay is normally operated a printer connected to the A Blinding terminals will be operative except during the selecting cycle when the error relay is released. Another set of terminals just below are marked "B Blinding" and a circuit from one to the other may be traced through the front contact and armature 1 of the lock out relay 509, the back contact and armature 1 of the K8 relay 506 so that a printer connected to these terminals will be blinded when the function actuate relay 506 has not been operated at a time when relay K6 is in its operated condition. Thus, if station number 6, as shown in Figs. 4 and 5, is selected and the K8 relay is operated, the blinding connection will be opened so that such a printer will be operative.

*Alternative receiving station circuit*

Fig. 10 is practically the same as Fig. 4 and may be substituted therefor. The arrangement of Fig. 10 is a circuit by which the clear out relay may be operated at the same time as the gate relay. Thus, following the circuit in Figs. 2, 10 and 5, when the line relay 1000 releases, a circuit will be established from battery, its armature and spacing contact, jack and plug unit number 15, the gate segment 228, the brush 220, the gate segment 227, number 16 plug and jack unit, the front contact and armature 2 of the pregate relay 1001 and thence to a divided circuit extending in one direction through the normal contacts of armature 2 of the gate relay 1002 and the winding of this relay and, in the other direction, through the winding of the K5 clear out relay 508. The K4 relay will operate and lock through its front contact and armature 2, the armature 4 and back contact of the K1 relay 1003 and thence through the circuit for causing the locking of this relay. As soon as the error relay has released the holding circuit for the K3 and K4 relays may be traced through the back contact and armature 4 of the K1 relay 1003 through the number 9 jack and plug unit, the off normal springs 236 and 233 to the source of battery connected to the number 10 plug and jack unit. As soon, however, as the brush 220 leaves the gate segment 228 the original circuit for the operation of the K4 relay 1002 will be opened and the clear out relay will be released. Thus the clear out segment 230 may be released from its duty as indicated in Fig. 2 and appropriated for another selecting functioning as indicated in Fig. 10.

*Timing charts*

The timing charts of Figs. 6 and 7 will indicate several operations over several selecting cycles. In Fig. 6 the timing of the transmitter elements has been described. Below this and under the bracket entitled "Receiver-First Selection F6" there is depicted the operations taking place in a receiver for the first selection, that is, before any selection has been made over the line. The K1 error relay is normally operated and will remain in operation for the first 240 milliseconds, that is, until the brush 200 leaves the stop segment 225. The pregate relay operates when the line coding relay in the transmitter sends the pregate pulse. The K4 gate relay comes into operation when the distributor at the receiving station leaves its gate contact. The clear out relay, as explained, will operate when the brush reaches the clear out segment. The lock out relay remains unoperated until the F1 segment is reached, whereupon the lock out relay again operates and remains operated thereafter. The K7 function storage relay F6 is operated in the F6 interval and at that particular selecting station where the connection therefor is provided. The K8 function actuate relay is operated at the end of the cycle. The K10 selection assurance relay normally operated up to this time therefore releases upon the operation of the K8 relay and causes a pulse to be sent over the line shortly after the end of the selecting cycle is indicated by the K11 selection assurance line coding relay.

In Fig. 7 the first group of time indications shows the effect of making a selection to add the F8 function. This group shows the reaction at the F6 station which results in no change at this point. The clear out relay does operate and opens the lock out circuit so that the F6 function storage relay is released but this is again operated in the F6 interval. Since the F6 function storage relay is already operated when the cycle comes to its end, the K6 function actuate relay has not been disturbed in its operation. Therefore, it is shown as having been operated before the cycle, throughout the cycle, and thereafter.

The next group of time indications relates to this same cycle, but depicts the operation of the F8 station. In this case the function storage relay is unoperated at the beginning of the cycle but operates in the F8 interval causing the operation of the function actuate relay at the end of the cycle and since this relay becomes operated at this time the K10 SA relay releases and sends out an SA signal.

Finally, the last group of time indications relates to a third selection and depicts the release of the F6 function actuate relay at the F6 station. Thus the clear out relay operates in the clear out interval and causes the K7 function storage relay to release at this time. Since it has been released by the release of the F6 button at the transmitting station, this relay will not reoperate in the F6 interval and therefore at the end of this selecting cycle the K8 function actuate relay releases and this change causes the operation of the K10 selection assurance relay so that a selection assurance pulse is transmitted over the line to operate the selection assurance lamp at the transmitting station.

What is claimed is:

1. A rotary distributor device for an electrical switching system, comprising a first constantly operating constant speed element, a second normally stationary element, means for clutching said second element to said first element, a third normally stationary element supporting a contact arm, means capable of being overpowered by said first element for securely holding said third element in a normal position, means operative after said second element has moved over a predetermined distance for clutching said third element to said second element, said last means including a latch for holding said second and third elements securely together to move said contact arm.

2. A rotary distributor device for an electrical switching system, comprising a first constantly operating constant speed element, a second normally stationary element, means for clutching said second element to said first element, a third normally stationary element supporting a contact arm, means capable of being overpowered by said first element for securely holding said third element in a normal position, means operative after said second element has moved over a predetermined distance for clutching said third element to said second element, said last means including a latch for holding said second and third elements securely together to move said contact arm and means for releasing said latch operative in said normal position of said third element.

3. A rotary distributor device for an electrical switching system, comprising a first constantly operating constant speed element, a second normally stationary element, means for clutching said second element to said first element, a third normally stationary element consisting of a disc supporting a contact arm, a notch in the periphery of said disc, a spring carrying a roller adapted to drop into said notch in the normal position of said disc, means operative after said second element has moved over a predetermined distance for clutching said third element to said second element, a latch for holding said second and third elements securely together to move said contact arm and means for releasing said latch as said third element approaches and reaches its said normal position.

4. A rotary distributor device for an electrical switching system, comprising a first constantly operating constant speed element, a second normally stationary element, means for clutching said second element to said first element, a third normally stationary element consisting of a disc supporting a contact arm, a notch in the periphery of said disc, a spring carrying a roller adapted to drop into said notch in the normal position of said disc, means operative after said second element has moved over a predetermined distance for clutching said third element to said second element, a latch for holding said second and third elements securely together to move said contact arm, means for releasing said latch and said clutching means as said third element approaches and reaches its said normal position and spring means connecting said second and said third elements for returning said second element over said predetermined distance to a normal position therefor.

5. A rotary distributor device for an electrical switching system, comprising a first constantly operating constant speed element, a second normally stationary element consisting of a disc, means for clutching said second element to said first element, a third normally stationary element consisting of a disc supporting a contact arm, an elongated opening in said third element disc, and a pin mounted on said second element disc extending through said opening and normally resting at one end of said elongated opening whereby upon the clutching of said second element to said first element said third element will remain stationary until said pin has travelled the whole length of said opening.

6. A rotary distributor device for an electrical switching system, comprising a first constantly operating constant speed element, a second normally stationary element consisting of a disc, means for clutching said second element to said first element, a third normally stationary element consisting of a disc supporting a contact arm, an elongated opening in said third element disc, a pin mounted on said second element disc protruding through said opening, a spring connecting said pin and said third element disc to normally hold said pin at one end of said elongated opening, a notch in the periphery of said third element disc, an off normal spring having an end normally resting in said notch to hold said third element disc in a normal position, said pin when said second element disc is clutched to said first element moving through said opening engaging the far end of said opening and effectively clutching said third element to said second element, a latch for securing said second and third elements together, a latch releasing means, and means for adjusting said releasing means for effective operation as said off normal spring drops into said notch.

7. A rotary distributor device for an electrical switching system, comprising a first constantly operating constant speed element, a second normally stationary element consisting of a disc, means for clutching said second element to said first element, a third normally stationary element consisting of a disc supporting a contact arm, an elongated opening in said third element disc, a pin mounted on said second element disc protruding through said opening, a spring connecting said pin and said third element disc to normally hold said pin at one end of said elongated opening, a notch in the periphery of said third element disc, an off normal spring having an end normally resting in said notch to hold said third element disc in a normal position, said pin when said second element disc is clutched to said first element moving through said opening engaging the far end of said opening and effectively clutching said third element to said second element, a latch for securing said second and third elements together, a latch releasing means, means for adjusting said releasing means for effective operation as said off normal spring drops into said notch and means responsive to said off normal spring for declutching said second and first elements.

8. A start stop distributor device for a selecting system provided with a constantly operating constant speed motor, a distributor arm, a rotatable notched disc associated with said distributor arm, a set of off normal springs normally resting in a notch in said disc and adapted for operation upon an off normal movement of said disc, a magnetic clutch for clutching said disc to said motor, means independent of said off normal springs for starting the energization of said clutch, means including said off normal springs for maintaining the energization of said clutch thereafter through a complete cycle of operation thereof and means for rapidly declutching said disc at the end of a said cycle including a retentivity neutralization means consisting of a permanent electrical connection to said clutch for slightly energizing said clutch in a direction opposite to the energization for normal operation thereof.

References Cited in the file of this patent

UNITED STATES PATENTS

| | | |
|---|---|---|
| 410,276 | Haenichen | Sept. 3, 1889 |
| 1,077,395 | Deats | Nov. 4, 1913 |
| 1,741,721 | Kelty | Dec. 31, 1929 |
| 1,853,225 | Rae | Apr. 12, 1932 |
| 1,883,163 | Van Voorhis | Oct. 18, 1932 |
| 2,297,090 | Weaver | Sept. 29, 1942 |
| 2,338,257 | Przysiecki | Jan. 4, 1944 |
| 2,398,007 | Hunter | Apr. 9, 1946 |
| 2,675,442 | Van Ryan | Apr. 13, 1954 |
| 2,675,536 | Schlaf | Apr. 13, 1954 |
| 2,675,537 | Cahill | Apr. 13. 1954 |